US006501703B2

(12) United States Patent
Zhou et al.

(10) Patent No.: US 6,501,703 B2
(45) Date of Patent: Dec. 31, 2002

(54) STATIC CORRECTION METHOD FOR EXPLORATION SEISMIC DATA USING FIRST ARRIVALS OF SEISMIC WAVES

(76) Inventors: Xixiang Zhou, 27#, Yinghuasi Street, Qingyang District, Chengdu City, Sichuan Province (CN), 610017; Benshan Zhong, 6-304#, South District, Chengdu University of Technology, Chengdu City, Sichuan Province (CN), 610059

( * ) Notice: Subject to any disclaimer, the term of this patent is extended or adjusted under 35 U.S.C. 154(b) by 0 days.

(21) Appl. No.: 09/935,761

(22) Filed: Aug. 24, 2001

(65) Prior Publication Data

US 2002/0075759 A1 Jun. 20, 2002

(30) Foreign Application Priority Data

Jan. 21, 2001 (CN) .......................................... 01107066

(51) Int. Cl.$^7$ ............................. G01V 1/00; G01V 1/18; G01V 1/28
(52) U.S. Cl. ............................................ 367/38; 702/14
(58) Field of Search .............................. 367/38, 72, 73; 702/14, 18

(56) References Cited

U.S. PATENT DOCUMENTS

| | | | | |
|---|---|---|---|---|
| 5,181,171 A | * | 1/1993 | McCormack et al. | 367/14 |
| 5,581,514 A | * | 12/1996 | Moldoveanu et al. | 181/110 |
| 5,587,968 A | * | 12/1996 | Barr | 367/54 |
| 5,742,740 A | * | 4/1998 | McCormack et al. | 706/14 |
| 6,424,920 B1 | * | 7/2002 | Osypov | 702/18 |

OTHER PUBLICATIONS

D. Marsden, "Static Corrections–a Review", Part 1, The Leading Edge, Jan. 1993, pp. 43–49.
D. Marsden, "Static Corrections–a Review", Part II, The Leading Edge, Feb. 1993, pp. 115–120.
D. Marsden, "Static Corrections–a Review", Part III, The Leading Edge, Mar. 1993, pp. 210–216.
M. Taner, et al., "A Unified Method for 2–D and 3–D Refraction Statics", Geophysics vol. 63, No. 1, Jan. 1998, pp. 260–274.

* cited by examiner

Primary Examiner—Gregory J. Toatley, Jr.
(74) Attorney, Agent, or Firm—Banner & Witcoff, Ltd.

(57) ABSTRACT

A shorter spatial wavelength static correction method for exploration seismic data using first arrivals according to the invention includes the steps of: based on a quadratic curve fitting to the first arrivals, which are picked up from seismic wave records of receiver gathers after the field statics, obtaining the difference $\Delta_{i,j}$ between the observed first arrival time $t_{ij}$ of the receiver point j with respect to the shot point i and the corresponding time value of the fitted quadratic curve; and forming the original matrix $\Delta$ having m×n elements $\Delta_{i,j}$, where n is the total number of shot points and m is the total number of receiver points of the line; substituting the elements of each row by the difference between the value of each element and the row average; and substituting the elements of each column by the difference between the value of each element and the column average; repeating the iteration until less than a predetermined error; the sum of the averages of the $i^{th}$ row for all iterations and the sum of the averages of the $i^{th}$ column for all iterations are the static correction value at the $i^{th}$ shot point and the static at the $j^{th}$ receiver point respectively. Said method is applicable to 3-D seismic survey by mean of using a formula of $r_{ij}=\sqrt{\Delta x_{ij}^2+\Delta y_{ij}^2}$ to transform 3-D seismic data into 2-D data, so that the 3-D seismic data processing is as simple as that of 2-D data.

8 Claims, 2 Drawing Sheets

STATIC CORRECTION METHOD FOR EXPLORATION SEISMIC DATA USING FIRST ARRIVALS OF SEISMIC WAVES

This application is based upon and claims the benefit of priority from Chinese Patent Application No. 01107066.8, filed Jan. 21, 2001, the entire contents of this application are incorporated herein by reference.

FIELD OF THE INVENTION

The present invention relates to a static correction method for exploration seismic data using the first arrivals of seismic waves recorded by receiver gathers on the earth surface. More particularly, the present invention relates to a shorter spatial wavelength static correction method for smoothing the time values of the first arrivals such as refracted seismic waves which are picked up from seismic gather records after the field static correction, to obtain shorter spatial wavelength static correction.

BACKGROUND OF THE ART

Seismic exploration method is the most widely used and effective geophysical technique in oil and gas exploration for locating the drilling sites. The seismic waves generated by artificial sources travel into the earth and return to the surface after reflection from interfaces between formations having acoustic impedance contrasts. The reflection and/or refraction of the seismic waves generated on the earth surface by respective shot points, which are arranged and moved in a predetermined regular manner, are recorded by receivers for detecting the generated seismic waves, which are laid along the ground at distances from the shot points in a predetermined manner. Variations in the reflection times from place to place indicate structural features in the strata underground. The seismic structure figures those come from seismic data processing and interpretation are the most important information to locate the drilling sites. Therefore, the detected arrival times and waveforms of the reflection generated by the interfaces between the geology formations on the seismic waves are processed and analyzed, and the status and location of the geology formations can be acquired and determined.

Due to the differences between various geology formations underground in composition, density, and uniformity of distribution etc., propagation velocities of the seismic waves generated by the shot points are correspondingly different therein, and the respective arrival times and waveforms of the reflection and/or refraction waves, which are generated by the interfaces between the formations having velocity and acoustic impedance contrasts and return to the surface of the earth, detected by the receivers are different from each other. Among these data, the first arrivals such as refracted waves, which are earliest detected and most significant and valuable for static corrections during processing, are the returned seismic waves after refracted by the lower boundary of the weathered low velocity layer (LVL) covering the land surface, such as desert and loess plateau, and mountainous area.

Usually the land surface is covered with a weathered layer of low velocity. The topography is never flat, the lower boundary of LVL is never planar. Variation in thickness and velocity of the upper layer can cause travel time delay or priority for waves to the surface. The reflections are diverged from the normal role—the hyperbola relationship between the arrival times and offsets(receiver—shot distances). It can cause a dramatic deterioration in the quality of seismic data. The reflection energy can not be focused in horizontal stack and the images of reflectors in seismic section become ambiguous. So static corrections for eliminating the divergence of wave arrivals are very important and become a key step of seismic data processing in exploration regions with complex LVL.

Investigations show that the particular geology formations of certain LVL have same influence on the divergence of the arrival time of the reflection waves from deeper strata as that for the first arrival waves refracted from the LVLs. By performing seismic static correction to the time values of the first arrivals detected by the respective receivers iteratively and in various manners, to eliminate the divergence of the arrival time of the first arrival waves refracted in the LVLs, as a result, the divergence of the reflected waves from the formations of deeper strata can be also eliminated, so that the formation of the deeper strata can be focused in the seismic data and the image thereof can be more clear.

So far, the most powerful techniques for receiver and shot point static corrections are refraction statics. They are used after field static correction and before residual static correction. The waves refracted by the interfaces between the LVL and consolidated rocks below are transmitted back to surface before the direct arrival and reflection arrivals, they are known as the headwaves and become conventional first arrivals in seismic records.

The conventional method of static corrections for receiver and shot point includes steps of: performing coarse field static correction to the original exploration seismic data recorded by each receiver using height and surface measurement; performing refraction static correction to the first arrivals, i.e., obtaining the LVL thickness and velocity by means of inversion of the structure of the LVL, then performing static correction by calculating the time difference; and performing residual static correction as well as other processes to the seismic data. However, because of the complexity of LVL model design and the non-uniqueness of inversion, the accuracy of the conventional refraction static usually is rather low for shorter spatial wavelength statics and they can not be satisfied in complex LVL regions in practice.

On the other hand, there are two modes in current seismic exploration: 2-D seismic survey and 3-D seismic survey. In 2-D seismic survey usually the shot points and receivers are laid along an exploration line, and the shot points are moved along the exploration line after each shot to get the exploration data, until the detection of one line is completed. After acquiring the data of one exploration line, data for other exploration lines can be acquired in the same manner. For 3-D seismic survey, the receivers of a shot are laid in several lines (for example, q) covered a region, and the shot points are also distributed in several lines (for example, p). Usually shot lines and receiver lines are in the same direction but not in same places, so that a two dimensional p×q exploration array is formed. During the data acquiring process of 3-D seismic survey, after each of the shot points in an array is activated once respectively to record the exploration waves, the whole exploration array is moved forward to activate all the shot points once again, until the detection of the whole area is completed.

Furthermore, the static correction for 3-D seismic exploration, especially the shorter spatial wavelength static correction using the first arrivals is much more complex than that for 2-D seismic exploration, and there is no effective method to convert 3-D seismic exploration data into 2-D seismic exploration data in static processing. Therefore, the shorter wave static correction for exploration seismic data using the first arrivals of refraction waves are mainly used in 2-D seismic data processing. It is difficult and thus rarely to apply shorter spatial wavelength static correction to 3-D seismic data processing.

SUMMARY OF THE INVENTION

In view of the above, an object of the present invention is to provide a novel shorter spatial wave static correction method for exploration seismic data using the first arrivals, which is simple in operation, and has better correction results. With the method of this invention, the static correction value can be obtained directly, and the curves of first arrivals can be smoothed, so that the reflection waves can be better focused and have more clear images.

Another object of the invention is to provide a shorter spatial wave static correction method, which is applicable to 2-D ad 3-D exploration seismic data both, especially applicable to the static correction of 3-D seismic data using first arrivals, and can also obtain satisfied correction results.

To achieve the objects of the invention, the present invention provides a shorter spatial wavelength static correction method for exploration seismic data using first arrivals, comprising the steps of:

a) performing fitting on the first arrival times picked up from the seismic records of receiver gathers after field static correction, to obtain a fitted curve of the first arrival time values with respect to distances between respective receiver points and shot points;

b) obtaining the time difference $\Delta_{i,j}$ between the first arrival time $t_{ij}$ detected by each of the receiver points j with respect to each of the shot points i and the respective time values on the fitted curve; and forming the original matrix $\Delta$ having m×n elements $\Delta_{i,j}$ as follows:

$$\Delta = \begin{bmatrix} \Delta_{1,1} & \Delta_{1,2} & \cdots & \Delta_{1,j} & \cdots & \Delta_{1,m} \\ \Delta_{2,1} & \Delta_{2,2} & \cdots & \Delta_{2,j} & \cdots & \Delta_{2,m} \\ \vdots & & & & & \\ \Delta_{i,1} & \Delta_{i,2} & \cdots & \Delta_{i,j} & \cdots & \Delta_{i,m} \\ \vdots & & & & & \\ \Delta_{n,1} & \Delta_{n,2} & \cdots & \Delta_{n,j} & \cdots & \Delta_{n,m} \end{bmatrix}$$

where i is the number of shot point and j is the number of receiver point, the size of matrix $\Delta$ is n×m, where n is the total number of shot points and m is the total number of receiver points of the line, i.e., $\Delta_{i,j}$ indicates the difference between observed first arrival and the time value of the fitted curve for the $j^{th}$ receiver point of the $i^{th}$ shot point.

c) taking average of the values for the elements of each row in the matrix $\Delta$, and obtaining the difference $\Delta'_{i,j}$ between the value $\Delta_{i,j}$ and the row average as follows:

where $m_1$ is the total number of elements with value which is not zero in the $i^{th}$ $$\Delta'_{i,j} = \Delta_{i,j} - \frac{\sum_{i=1}^{m_1} \Delta_{i,j}}{m_1}$$

row of the matrix $\Delta$;

d) substituting $\Delta'_{i,j}$ for $\Delta_{i,j}$ in the matrix $\Delta$, and form the matrix $\Delta'$:

$$\Delta' = \begin{bmatrix} \Delta'_{1,1} & \Delta'_{1,2} & \cdots & \Delta'_{1,j} & \cdots & \Delta'_{1,m} \\ \Delta'_{2,1'} & \Delta'_{2,2} & \cdots & \Delta'_{2,j} & \cdots & \Delta'_{2,m} \\ \vdots & & & & & \\ \Delta'_{i,1} & \Delta'_{i,2} & \cdots & \Delta'_{i,j} & \cdots & \Delta'_{i,m} \\ \vdots & & & & & \\ \Delta'_{n,1} & \Delta'_{n,2} & \cdots & \Delta'_{n,j} & \cdots & \Delta'_{n,m} \end{bmatrix};$$

e) taking average of the values for the elements of each column in the matrix $\Delta'$, and calculates the differences:

$$\Delta''_{i,j} = \Delta'_{i,j} - \frac{\sum_{j=1}^{n_1} \Delta'_{i,j}}{n_1}$$

where $n_1$ is the total number of elements with value which is not zero in the $j^{th}$ column of the matrix $\Delta'$;

f) substituting $\Delta''_{i,j}$ for $\Delta'_{i,j}$ in the matrix $\Delta'$ and forming the matrix $\Delta''$:

$$\Delta'' = \begin{bmatrix} \Delta''_{1,1} & \Delta''_{1,2} & \cdots & \Delta''_{1,j} & \cdots & \Delta''_{1,m} \\ \Delta''_{2,1} & \Delta''_{2,2} & \cdots & \Delta''_{2,j} & \cdots & \Delta''_{2,m} \\ \vdots & & & & & \\ \Delta''_{i,1} & \Delta''_{i,2} & \cdots & \Delta''_{i,j} & \cdots & \Delta''_{i,m} \\ \vdots & & & & & \\ \Delta''_{n,1} & \Delta''_{n,2} & \cdots & \Delta''_{n,j} & \cdots & \Delta''_{n,m} \end{bmatrix};$$

g) repeat the above steps c) to f) to perform iterations, until the value of $|\Delta_{i,j}|$ become less than a given small value, which means the iteration process is converged;

h) finding sum of the averages of the elements in $i^{th}$ row for all iterations as the static correction value at the $i^{th}$ shot point, and finding sum of the averages of the elements in the $j^{th}$ column for all iterations as the static correction value at the $j^{th}$ receiver point; and i) perform static correction to the exploration seismic data using said static correction values for the respective $i^{th}$ shot points and $j^{th}$ receiver points, to obtain corrected seismic data.

For 3-D seismic surveys, the shorter spatial wavelength static correction method according to the invention further comprises a step of using formula of $r_{ij}=\sqrt{\Delta x_{ij}^2 + \Delta y_{ij}^2}$, before the step a), to transform 3-D seismic data into 2-D data in the case of 3-D seismic surveys, where $\Delta x_{ij}$ is the abscissa difference between $i^{th}$ shot point and $j^{th}$ receiver, $\Delta y_{ij}$ is the ordinate difference between $i^{th}$ shot point and $j^{th}$ receiver, and $r_{ij}$ is the distance difference between $i^{th}$ shot point and $j^{th}$ receiver, so that the 3-D seismic data processing is as simple as that of 2-D data.

DETAILED DESCRIPTION TO THE PREFERRED EMBODIMENTS

Figure 1:
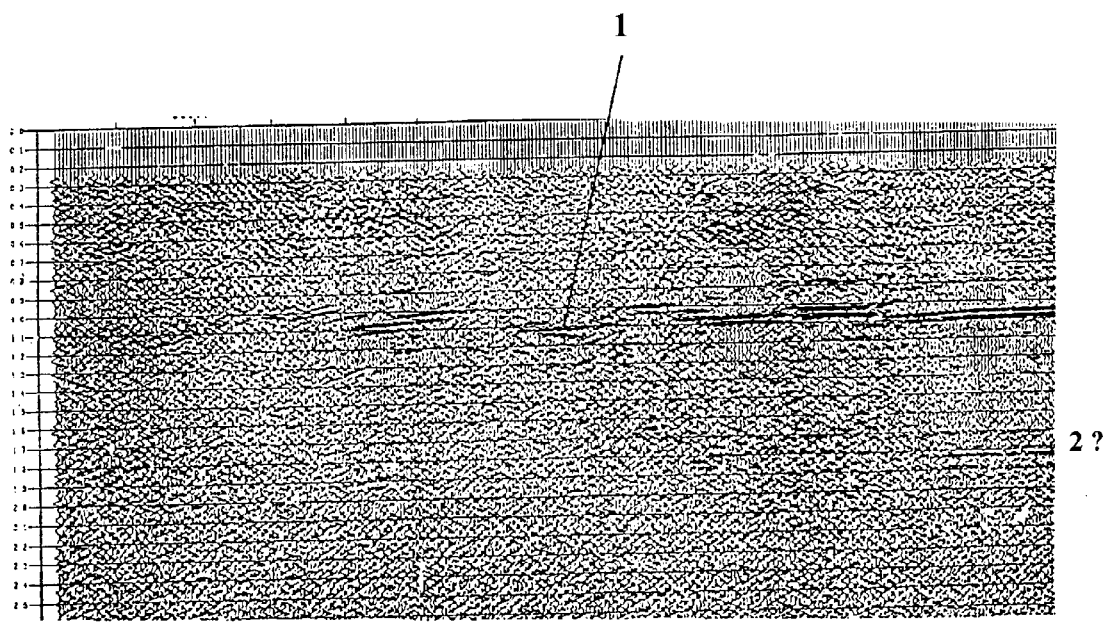
FIG. 1 illustrates an example for image of 2-D seismic exploration data before being processed with the method according to one embodiment of the present invention.

A conventional process for seismic exploration data may include the following procedures: field static correction; residual correction; velocity analysis; normal moveout and stacking. The shorter spatial wavelength static correction method for exploration seismic data using first arrivals according to the present invention, so called method for smoothing first arrivals, can be performed after the field correction and before the residual correction.

The first arrivals of seismic data of gathers before stack are used as the basic data for the static correction method of the invention. Suppose the first arrivals of, for example, the CSP(common shot point) gathers after field statics are picked up. For a spread of 2-D seismic survey, a shot point is usually at the middle of the spread and receivers are arranged on both side of shot points along the exploration line. Consider the first arrivals of one half(or a part of them) of a gather(spread) or L gathers, a quadratic curve is used to fit them using least square fit method. Same processing is used for another half of the gathers and also for all gathers. Therefore, a fitted quadratic curve is obtained for the first arrival time values after field static correction processing to the time values of the first arrival refracted seismic waves recorded by receiver gathers.

The shorter spatial wavelength static correction method for exploration seismic data using first arrivals according to one embodiment of the present invention includes the steps of: obtaining the time difference $\Delta_{i,j}$ between the first arrival time $t_{ij}$ detected by each of the receiver points j with respect to each of the shot points i and the respective time values on the fitted quadratic curve; and forming the original matrix $\Delta$ having m×n elements $\Delta_{i,j}$ as follows:

$$\Delta = \begin{bmatrix} \Delta_{1,1} & \Delta_{1,2} & \cdots & \Delta_{1,j} & \cdots & \Delta_{1,m} \\ \Delta_{2,1} & \Delta_{2,2} & \cdots & \Delta_{2,j} & \cdots & \Delta_{2,m} \\ \vdots & & & & & \\ \Delta_{i,1} & \Delta_{i,2} & \cdots & \Delta_{i,j} & \cdots & \Delta_{i,m} \\ \vdots & & & & & \\ \Delta_{n,1} & \Delta_{n,2} & \cdots & \Delta_{n,j} & \cdots & \Delta_{n,m} \end{bmatrix}$$

where i is the number of shot point and j is the number of receiver point, the size of matrix $\Delta$ is n×m, where n is the total number of shot points and m is the total number of receiver points of the line. In other words, $\Delta_{i,j}$ indicate the difference between observed first arrival and the time value of the fitted curve for the $j^{th}$ receiver point of the $i^{th}$ shot point.

Take average of the values for the elements of each row in the matrix $\Delta$, and the difference $\Delta'_{i,j}$ between the value $\Delta_{i,j}$ and the row average is:

$$\Delta'_{i,j} = \Delta_{i,j} - \frac{\sum_{i=1}^{m_1} \Delta_{i,j}}{m_1}$$

Where $m_1$ is the total number of elements with value which is not zero in the $i^{th}$ row of the matrix $\Delta$. $\Delta'_{i,j}$ are used to substitute $\Delta_{i,j}$ and form the matrix $\Delta'$:

$$\Delta' = \begin{bmatrix} \Delta'_{1,1} & \Delta'_{1,2} & \cdots & \Delta'_{1,j} & \cdots & \Delta'_{1,m} \\ \Delta'_{2,1} & \Delta'_{2,2} & \cdots & \Delta'_{2,j} & \cdots & \Delta'_{2,m} \\ \vdots & & & & & \\ \Delta'_{i,1} & \Delta'_{i,2} & \cdots & \Delta'_{i,j} & \cdots & \Delta'_{i,m} \\ \vdots & & & & & \\ \Delta'_{n,1} & \Delta'_{n,2} & \cdots & \Delta'_{n,j} & \cdots & \Delta'_{n,m} \end{bmatrix};$$

Then take average of the values for the elements of each column in the matrix $\Delta'$, and calculates the differences:

$$\Delta''_{i,j} = \Delta'_{i,j} - \frac{\sum_{j=1}^{n_1} \Delta'_{i,j}}{n_1}$$

Where $n_1$ is the total number of elements with value which is not zero in the $j^{th}$ column of the matrix $\Delta'$. $\Delta''_{i,j}$ are used to substitute $\Delta'_{i,j}$ and form the matrix $\Delta''$:

$$\Delta'' = \begin{bmatrix} \Delta''_{1,1} & \Delta''_{1,2} & \cdots & \Delta''_{1,j} & \cdots & \Delta''_{1,m} \\ \Delta''_{2,1} & \Delta''_{2,2} & \cdots & \Delta''_{2,j} & \cdots & \Delta''_{2,m} \\ \vdots & & & & & \\ \Delta''_{i,1} & \Delta''_{i,2} & \cdots & \Delta''_{i,j} & \cdots & \Delta''_{i,m} \\ \vdots & & & & & \\ \Delta''_{n,1} & \Delta''_{n,2} & \cdots & \Delta''_{n,j} & \cdots & \Delta''_{n,m} \end{bmatrix};$$

The above process from $\Delta$ to $\Delta''$ is called an iteration. Repeat the process from $\Delta$ to $\Delta''$, the values of $\Delta_{i,j}$ in the iterations decrease, and after several iterations $|\Delta_{i,j}|$ will become less than a given small value or a predetermined error, which means the iteration process is converged. Therefore, the sum of the averages of elements in the $i^{th}$ row for all iterations is the static correction value at the $i^{th}$ shot point, and the sum of the averages of the elements in the $j^{th}$ column for all iterations is the static correction value at the $j^{th}$ receiver point.

When the shorter spatial wavelength static correction of the first arrivals is applied to 2-D seismic data according to the above method of the present invention, the said $i^{th}$ row $j^{th}$ column element $\Delta_{i,j}$ of the original matrix is the difference between the observed first arrival time $t_{ij}$ of the $j^{th}$ receiver point in the total detection points m with respect to the $i^{th}$ shot point in the total shot points n and the corresponding time value of the fitted quadratic curve during the 2-D exploration processing of one detection line.

When the shorter spatial wavelength static correction of the first arrivals is applied to 3-D seismic data according to the above method of the present invention, the said $i^{th}$ row $j^{th}$ column element $\Delta_{i,j}$ of the original matrix is the difference between the picked up first arrival time $t_{ij}$ of the $j^{th}$ receiver point in the total detection points m of q detection lines with respect to the $i^{th}$ shot point in the p lines of shot points and the corresponding time value of the fitted quadratic curve during the 3-D exploration processing of one detection area consisting of p shot point lines and q detection lines. Although the size of the matrix $\Delta$ for 3-D exploration seismic data increases a lot, however, the above mentioned iteration processing method is simple and therefore its processing speed is fast enough to satisfy the requirements and is available for practical use.

The above difference matrix iteration is equivalent to smooth operations of the first arrivals, as the result of the iteration, the first arrivals and also the reflections after the static corrections according to the method of the invention becomes smooth curves. So the reflections can be focused in horizontal stack and the images of reflectors become more clear in seismic sections.

In previous discussion least squares fit of first arrivals by quadratic curves and matrix iteration processing is suitable to common shot point(CSP), common receiver point(CRP) and common mid-point(CMP) gathers. For common offset gathers, the matrix smoothing is not necessary, and can be replaced by simple numeral smooth processing.

In practice, when using the static correction method of the present invention, the process of obtaining the fitted quadratic curve with respect to the first arrivals, which are picked up from seismic records of receiver gathers after the field static correction, is a simple technique. However, since it is the basis of the invention and can influence the processing result of the method according to the present invention, according to one embodiment of the invention, the data to be fitted are selected from first arrivals in a reliable curve portion for each shot point, and then make a least squares fit on the first arrivals with a quadratic curve. If the selected curve portion of the first arrivals is approximately a straight line, a straight line fit can be used. If all of the curves of first arrivals for several shot points have similar characteristics and coincide with each other, one curve of least square fit of first arrivals can be used for fitting instead of using a plurality of fitting curves. The above mentioned predetermined error for respective matrix iteration process can be determined considering different areas and/or geology formations and/or required accuracy of exploration.

Since the recorded points of each shot point are only a small part of the whole bunch detection points during exploration, in case that first arrivals of several detection points are recorded, it is allowable and normal that some of the elements in the above difference matrix do not have any data or are missing, and only part of the elements of the difference matrix have valid data according to the present invention. Field tests conducted by the inventors indicate that it is available and acceptable to obtain the row average and column average and execute the element substitution process of the respective corresponding elements in the matrix, by setting the missing elements to zero and not using the missing element $\Delta_{i,j}$, in case there are missing element $\Delta_{i,j}$ in the matrix, according to the static correction method of the present invention.

It is concluded that only 3–5 iterations may be needed in the above process on the basis of several hundreds of field tests, and can achieve required accuracy.

In most of cases the first arrivals are refractions, but sometimes they may be turning waves, transmitted waves and so on. No matter what waves are the first arrivals, the method of the present invention is applicable and effective.

It should be appreciated that all the above fitting calculations, matrix operations and calculations, iterations related to the static correction can be implemented by a general purpose computer, or any other type of computers with proper coding according to the method of the invention, the detail of which is omitted.

Figure 2:
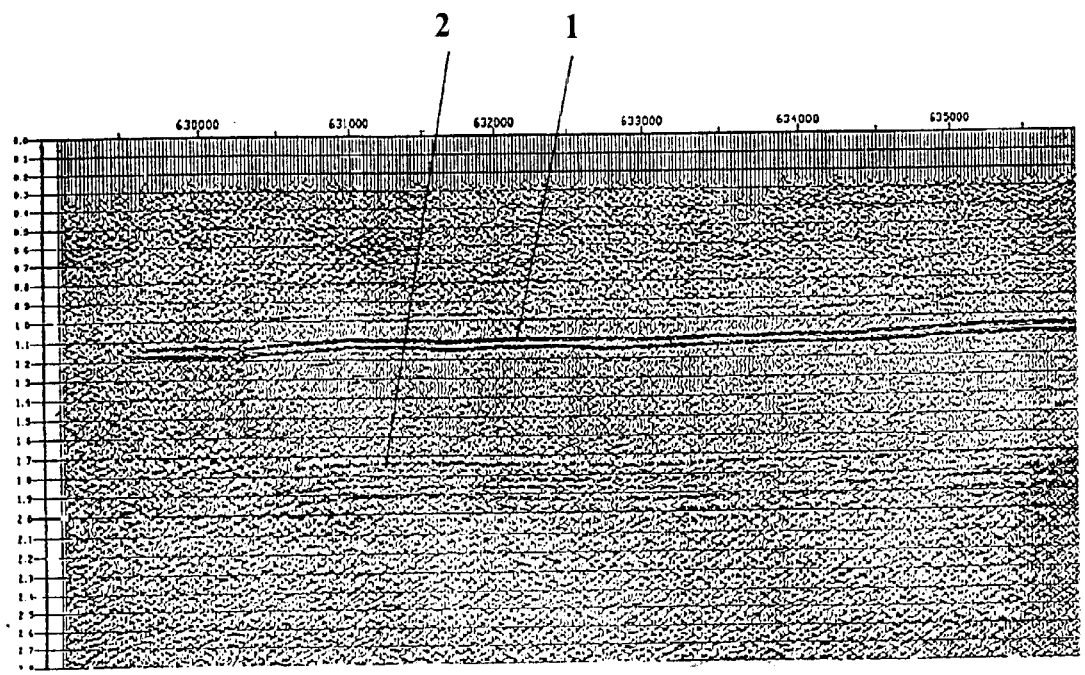
FIG. 2 illustrates an example for image of 2-D seismic exploration data obtained after processing the image data in FIG. 1 with the method according to the embodiment of the present invention.

FIG. 1 and FIG. 2 illustrate an example for images of 2-D seismic exploration data before and after being processed with the static correction method using first arrivals according to one embodiment of the present invention.

This example relates to 2-D static processing for line 196. The total number of shot points is 1742; the number of receivers in a shot point (or the trace number in a CSP gather) is 240. The shot point is at the middle of a spread. The distance between two nearest shot points (the space of shots) is 100 m, the space of receivers is 50 m. CSP gathers are chosen for the computation. The number of gathers for smooth L=1000. The length of smooth interval is 1250 m (from 250 m to 1500 m, or 25 traces in a gather). The size of difference matrix is 1742(row)×3722(column). Convergence is obtained in 3 iterations, the sum of square for all element, of the difference matrix decrease to $\frac{1}{100} \sim \frac{1}{1000}$ in every iteration.

FIG. 1 is the image of the seismic section before the static correction processing according to the present invention. In FIG. 1, there are many strata underground, among which 1 indicates the reflection from one of the strata which is shallower, and 2 indicates the reflection from one of the strata which is deeper. As shown in FIG. 1, the image of the horizon 1 in the FIG. 1 is not clear and continuous. The reflection 2 from the deeper strata in the image is ambiguous and difficult to be identified. FIG. 2 is the image of the seismic section after the shorter spatial wavelength static correction processing of the first arrivals according to the present invention. As shown in FIG. 2, the horizon 1 becomes more clear and smooth, and the deeper horizon 2 is also displayed clearly, and can be recognized more easily.

When the seismic data of the above example is processed by selecting CRP, CMP and common offset gathers, similar results can be obtained.

As shown from the contrast between the images in FIG. 1 and FIG. 2, the direct and obvious benefit from the shorter spatial wavelength static correction method according to the present invention is that after static correction according to the invention, the ambiguous image of the reflections in the complex LVL regions become smooth curves in all gathers. So the reflections can be focused in horizontal stack and the images of the reflectors can be displayed more clearly in seismic sections. The test result also shows that satisfied results can be acquired in the processes of common shot point (CSP), common receiver point (CRP) and common mid-point (CMP) gathers using the above method according to the present invention, and proves that the method of the present invention has good universal applicability.

The static correction method using first arrivals can also be applied for 3-D seismic data. In this case, formula of $r_{ij} = \sqrt{\Delta x_{ij}^2 + \Delta y_{ij}^2}$ is used to transform abscissa(x) and ordinate(y) differences between the respective shot points i and receivers j into the distances $r_{ij}$, where $\Delta x_{ij}$ is the abscissa difference between $i^{th}$ shot point and $j^{th}$ receiver, $\Delta y_{ij}$ is the ordinate difference between $i^{th}$ shot point and $j^{th}$ receiver, and $r_{ij}$ is the distance difference between $i^{th}$ shot point and $j^{th}$ receiver. Then 3-D seismic data with $r_{ij}$ can be processed as 2-D seismic data to use the technique of this invention for and only for the static processing. Therefore, the method of the invention is also applicable to static correction in 3-D exploration seismic data.

Figure 3:
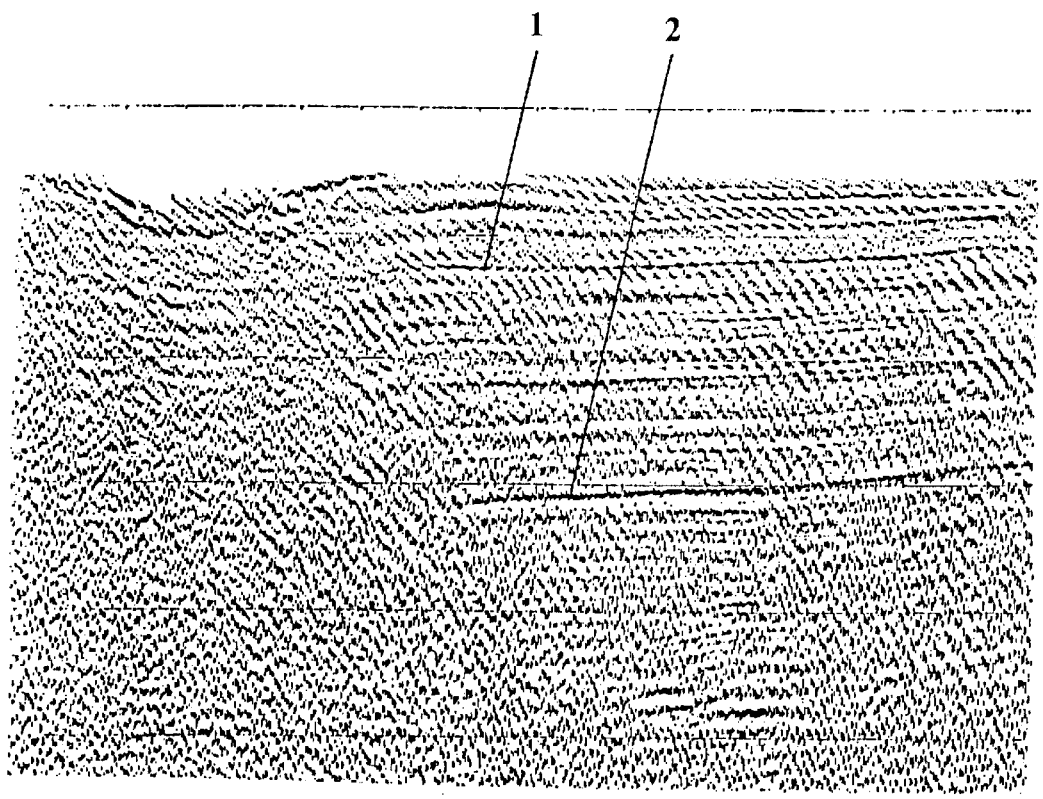
FIG. 3 illustrates an example for image of 3-D seismic exploration data before being processed with the method according to another embodiment of the present invention.
Figure 4:
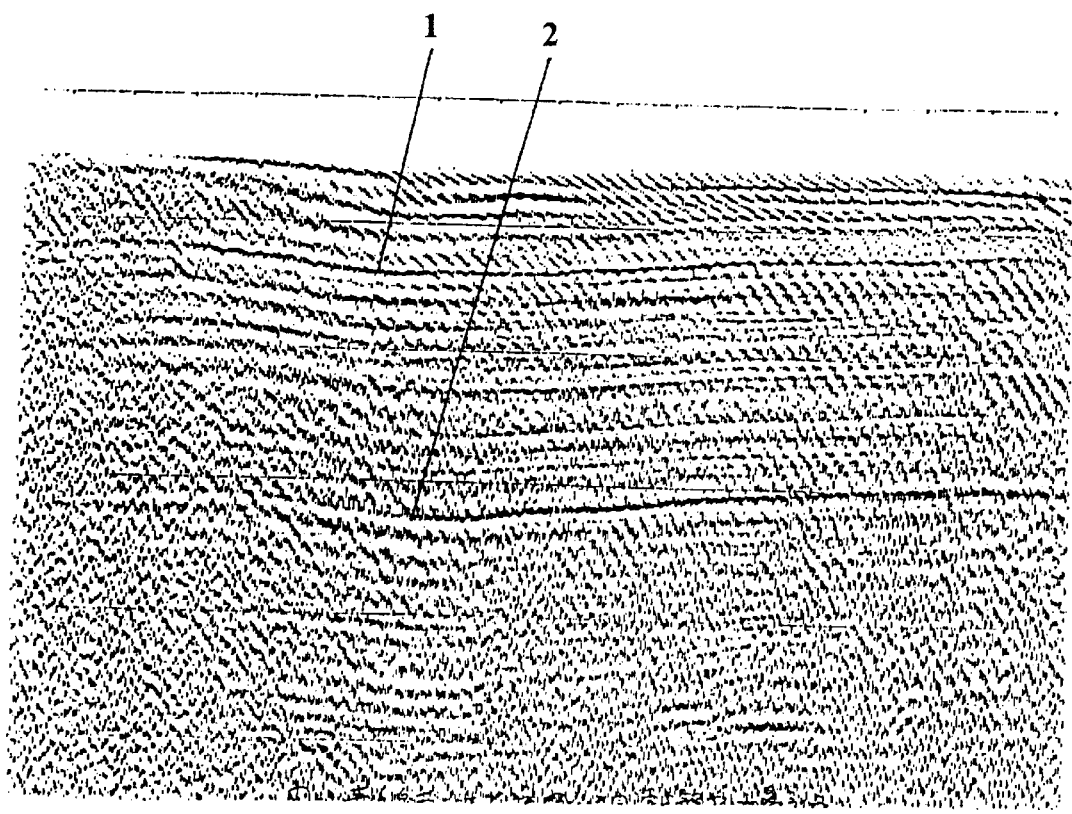
FIG. 4 illustrates an example for image of 3-D seismic exploration data obtained after processing the image data in FIG. 3 with the method according to said another embodiment of the present invention.

FIG. 3 and FIG. 4 illustrate an example for images of 3-D seismic exploration data before and after being processed with the static correction method using first arrivals according to another embodiment of the present invention.

This example relates to 3-D processing using the static correction method according to a second embodiment of the invention. The total number of shot points, for 6 shot point lines and 6 receiver lines 3-D seismic survey, is 596. The number of receivers in a shot point (or the trace number in a CSP gather) is 720. The space of shot points and receivers is 40 m. CSP gathers are chosen for the computation. The number of gathers for smooth L=15; The number of points for smooth is 877 (from $23^{rd}$ point to $900^{th}$ point). Convergence is obtained in 5 iterations, the sum of square for all elements of the difference matrix decrease by $\frac{1}{100} \sim \frac{1}{1000}$ in every iteration.

FIG. 3 is an image of the seismic section before the technique according to the present invention is applied. In FIG. 3, there are many strata underground, among which 1 indicates the reflection from one of the strata which is shallower, and 2 indicates the reflection from one of the strata which is deeper. As shown in FIG. 3, the image of the horizon 1 is not clear nor smooth, and the images of the deeper strata, i.e., the horizon 2 can not be easily identified. FIG. 4 is the image of the seismic data after the processing of shorter spatial wavelength static correction of the first arrivals according to the present invention. The horizon 1 becomes clear and smooth, and the deeper horizon 2 is also displayed clearly, and can be easily recognized.

As described above, after converting the 3-D seismic data into 2-D data, the shorter spatial wavelength static correction of the first arrivals in 3-D exploration seismic data, which can not be processed with conventional techniques, can be easily and efficiently performed, and the correction results are excellent, as shown in FIG. 4.

Applicability of Industry:

The static correction method using first arrivals is specially effective for shorter spatial wavelength static corrections even in exploration regions with complex low velocity layers(LVL) such as in desert, loess plateau and mountainous area, and also effective for long spatial wavelength static in some cases. Said method is applicable to 2-D and 3-D statics, and the 3-D seismic data processing is as simple as 2-D data. Using the static correction method of the invention, the first arrivals of all gathers become smooth curves, and the reflections can be properly focused in horizontal stack, so that the images of reflectors from deeper strata in seismic profiles become more clear.

Having described and illustrated the principles of the invention in the preferred embodiments thereof, it should be apparent that the invention can be modified in arrangement and detail, without departing from the spirit and scope of the invention.

What is claimed is:

1. A shorter spatial wavelength static correction method for exploration seismic data using first arrivals, comprising the steps of:

a) performing fitting on the first arrival times picked up from seismic records of receiver gathers after field static correction, to obtain a fitted curve of the first arrival time values with respect to distances between respective receiver points and shot points;

b) obtaining the time difference $\Delta_{i,j}$ between the first arrival time $t_{ij}$ detected by each of the receiver points j with respect to each of the shot points i and the respective time values on the fitted curve, and forming the original matrix $\Delta$ having m×n elements $\Delta_{i,j}$ as follows:

$$\Delta = \begin{bmatrix} \Delta_{1,1} & \Delta_{1,2} & \cdots & \Delta_{1,j} & \cdots & \Delta_{1,m} \\ \Delta_{2,1} & \Delta_{2,2} & \cdots & \Delta_{2,j} & \cdots & \Delta_{2,m} \\ \vdots & & & & & \\ \Delta_{i,1} & \Delta_{i,2} & \cdots & \Delta_{i,j} & \cdots & \Delta_{i,m} \\ \vdots & & & & & \\ \Delta_{n,1} & \Delta_{n,2} & \cdots & \Delta_{n,j} & \cdots & \Delta_{n,m} \end{bmatrix}$$

where i is the number of shot point and j is the number of receiver point, the size of matrix $\Delta$ is n×m, where n is the total number of shot points and m is the total number of receiver points of the line, i.e., $\Delta_{i,j}$ indicates the difference between observed first arrival and the time value of the fitted curve for the $j^{th}$ receiver point of the $i^{th}$ shot point, c) taking average of the values for the elements of each row in the matrix $\Delta$, and obtaining the difference $\Delta'_{i,j}$ between the value $\Delta_{i,j}$ and the row average as follows:

$$\Delta'_{i,j} = \Delta_{i,j} - \frac{\sum_{j=1}^{m_1} \Delta_{i,j}}{m_1}$$

where $m_1$ is the total number of elements with value which is not zero in the $i^{th}$ row of the matrix $\Delta$;

d) substituting $\Delta'_{i,j}$ for $\Delta_{i,j}$ in the matrix $\Delta$, and form the matrix $\Delta'$:

$$\Delta' = \begin{bmatrix} \Delta'_{1,1} & \Delta'_{1,2} & \cdots & \Delta'_{1,j} & \cdots & \Delta'_{1,m} \\ \Delta'_{2,1'} & \Delta'_{2,2} & \cdots & \Delta'_{2,j} & \cdots & \Delta'_{2,m} \\ \vdots & & & & & \\ \Delta'_{i,1} & \Delta'_{i,2} & \cdots & \Delta'_{i,j} & \cdots & \Delta'_{i,m} \\ \vdots & & & & & \\ \Delta'_{n,1} & \Delta'_{n,2} & \cdots & \Delta'_{n,j} & \cdots & \Delta'_{n,m} \end{bmatrix};$$

e) taking average of the values for the elements of each column in the matrix $\Delta'$, and calculates the differences:

$$\Delta''_{i,j} = \Delta'_{i,j} - \frac{\sum_{j=1}^{n_1} \Delta'_{i,j}}{n_1}$$

where $n_1$ is the total number of elements with value which is not zero in the $j^{th}$ column of the matrix $\Delta'$;

f) substituting $\Delta''_{i,j}$ for $\Delta'_{i,j}$ in the matrix $\Delta'$ and forming the matrix $\Delta''$:

$$\Delta'' = \begin{bmatrix} \Delta''_{1,1} & \Delta''_{1,2} & \cdots & \Delta''_{1,j} & \cdots & \Delta''_{1,m} \\ \Delta''_{2,1} & \Delta''_{2,2} & \cdots & \Delta''_{2,j} & \cdots & \Delta''_{2,m} \\ \vdots & & & & & \\ \Delta''_{i,1} & \Delta''_{i,2} & \cdots & \Delta''_{i,j} & \cdots & \Delta''_{i,m} \\ \vdots & & & & & \\ \Delta''_{n,1} & \Delta''_{n,2} & \cdots & \Delta''_{n,j} & \cdots & \Delta''_{n,m} \end{bmatrix};$$

g) repeat the above steps c) to f) to perform iterations, until the value of $|\Delta_{i,j}|$ become less than a given small value, which means the iteration process is converged;

h) finding sum of the averages of the elements in $i^{th}$ row for all iterations as the static correction value at the $i^{th}$ shot point, and finding sum of the averages of the elements in the $j^{th}$ column for all iterations as the static correction value at the $j^{th}$ receiver point;

i) perform static correction to the exploration seismic data using said static correction values for the respective $i^{th}$ shot points and $j^{th}$ receiver points, to obtain corrected seismic data.

2. The shorter spatial wavelength static correction method according to claim 1, wherein in case of 3-D seismic surveys, before the step a), said method further comprises a step of using formula of $r_{ij}=\sqrt{\Delta x_{ij}^2 + \Delta y_{ij}^2}$ to transform 3-D seismic data into 2-D data in the case of 3-D seismic surveys, where $\Delta x_{ij}$ is the abscissa difference between $i^{th}$ shot point and $j^{th}$ receiver, $\Delta y_{ij}$ is the ordinate difference between $i^{th}$ shot point and $j^{th}$ receiver, and $r_{ij}$ is the distance difference between $i^{th}$ shot point and $j^{th}$ receiver.

3. The shorter spatial wavelength static correction method according to claim 1, wherein said fitting is performed with least square method based on one of a quadratic curve and a straight line.

4. The shorter spatial wavelength static correction method according to claim 3, wherein any missing element $\Delta_{i,j}$ in the said matrix $\Delta$ is not involved in the row average and column average calculation, and the substitution operation for its own place in the matrix in steps c)–f).

5. The shorter spatial wavelength static correction method according to claim 4, wherein total number of the iterations of said matrix is 3–5.

6. The shorter spatial wavelength static correction method according to claim 1, wherein said $i^{th}$ row $j^{th}$ column element $\Delta_{i,j}$ of the original matrix is the difference between the observed first arrival time $t_{ij}$ of the $j^{th}$ receiver point in the total detection points m with respect to the $i^{th}$ shot point in the total shot points n and the corresponding time value of the fitted quadratic curve during the 2-D exploration processing of one detection line.

7. The shorter spatial wavelength static correction method according to claim 2, wherein said $i^{th}$ row $j^{th}$ column element $\Delta_{i,j}$ of the original matrix is the difference between the picked up first arrival time $t_{ij}$ of the $j^{th}$ receiver point in the total detection points m of q detection lines with respect to the $i^{th}$ shot point in the p lines of shot points and the corresponding time value of the fitted quadratic curve during the 3-D exploration processing of one detection area consisting of p shot point lines and q detection lines.

8. The shorter spatial wavelength static correction method according to claim 2, wherein said fitting is performed with least square method based on one of a quadratic curve and a straight line.

* * * * *

UNITED STATES PATENT AND TRADEMARK OFFICE
CERTIFICATE OF CORRECTION

PATENT NO.   : 6,501,703 B2
DATED        : December 31, 2002
INVENTOR(S)  : Xixiang Zhou et al.

It is certified that error appears in the above-identified patent and that said Letters Patent is hereby corrected as shown below:

Column 10,
Line 59, "$r_{ij} = \sqrt{\Delta x_{ij^2 + \Delta y_{ij^2}}}$" has been replaced with -- $r_{ij} = \sqrt{\Delta x_{ij}^2 + \Delta y_{ij}^2}$ --.

Signed and Sealed this

Twenty-ninth Day of July, 2003

JAMES E. ROGAN
*Director of the United States Patent and Trademark Office*